US008599455B1

United States Patent
Briggs et al.

(10) Patent No.: US 8,599,455 B1
(45) Date of Patent: *Dec. 3, 2013

(54) METHOD AND APPARATUS FOR PERFORMING COLOR PLANE ADJUSTMENT

(75) Inventors: Randall D. Briggs, Boise, ID (US); Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,178

(22) Filed: Jun. 10, 2011

Related U.S. Application Data

(63) Continuation of application No. 11/811,687, filed on Jun. 11, 2007, now Pat. No. 7,965,429.

(60) Provisional application No. 60/813,262, filed on Jun. 12, 2006.

(51) Int. Cl.
*G03F 3/08* (2006.01)
*G09G 5/02* (2006.01)

(52) U.S. Cl.
USPC ........... 358/518; 358/520; 358/523; 345/597; 345/600; 345/602; 345/604

(58) Field of Classification Search
None
See application file for complete search history.

(56) References Cited

U.S. PATENT DOCUMENTS

| 5,315,415 | A | 5/1994 | Kawai et al. | |
|---|---|---|---|---|
| 5,784,065 | A * | 7/1998 | Kakutani | 345/591 |
| 6,995,866 | B2 | 2/2006 | Feng et al. | |
| 2003/0151782 | A1 | 8/2003 | Watanabe | |
| 2004/0264772 | A1 * | 12/2004 | Une | 382/167 |
| 2005/0062985 | A1 | 3/2005 | Lammens et al. | |
| 2005/0128498 | A1 | 6/2005 | Matsuzaki | |
| 2006/0078216 | A1 * | 4/2006 | Kaku | 382/254 |
| 2006/0197998 | A1 | 9/2006 | Shibuya et al. | |
| 2006/0268302 | A1 * | 11/2006 | Chen et al. | 358/1.9 |

FOREIGN PATENT DOCUMENTS

JP 04-185075 7/1992

* cited by examiner

*Primary Examiner* — Benny Q Tieu
*Assistant Examiner* — Haris Sabah

(57) ABSTRACT

A method and apparatus for performing color plane adjustment are provided. In one embodiment, an apparatus comprises a set of inputs for receiving a first input value and a second input value in a color space. The apparatus also comprises a color plane adjustment component operative to adjust the first input value and the second input value by amounts that depend on a distance of the first input value and second input value, respectively, from a value of neutral gray in the color space. The apparatus further comprises a set of outputs for outputting the adjusted first and second values. A related method and computer program are disclosed. Other embodiments are disclosed, and each of the embodiments can be used alone or together in combination.

20 Claims, 5 Drawing Sheets

METHOD AND APPARATUS FOR PERFORMING COLOR PLANE ADJUSTMENT

CROSS-REFERENCE TO RELATED APPLICATION

This present disclosure is a continuation of U.S. application Ser. No. 11/811,687, filed on Jun. 11, 2007, which claims priority under 35 U.S.C. §119(e) to U.S. Provisional Application No. 60/813,262, filed Jun. 12, 2006. The disclosures of the applications referenced above are incorporated herein by reference.

TECHNICAL FIELD

The invention relates to scanners, printers, copiers, and other types of image processing systems that process color information used to represent an image. More particularly, the invention relates to performing color plane adjustment in an image processing system.

BACKGROUND

Scanner, printers, and copiers are all examples of image processing systems that process bit information representing colors in the image. The images are represented by pixels, each of which includes bits that represent the colors. For example, in some image processing systems (e.g., a scanner), each pixel is defined by 16 bits that represent the amount of red in the pixel, 16 bits that represent the amount of green in the pixel, and 16 bits that represent the amount of blue in the pixel. Thus, each pixel is represented in these systems by 48 bits.

Scanning a black-and-white document with a color scanner introduces some color into the output, which is due to imperfections in the scanner elements. The spurious color can be objectionable, and a color plane adjustment component can be used to remove the spurious color. In operation, the scanner output for various shades of gray is measured, and an offset value is generated. The offset value is programmed into the color plane adjustment component, and the color plane adjustment component adds the offset value to the values in a three-dimensional color space that represent color (e.g., Cr and Cb values). However, the color plane adjustment component adds this offset to every color value in the three-dimensional color space—not just gray values. For color values that are far from gray, this correction is unnecessary and undesirable.

SUMMARY

The present invention is defined by the following claims, and nothing in this section should be taken as a limitation on those claims.

By way of introduction, in one embodiment, an apparatus for performing color plane adjustment is provided. The apparatus comprises a set of inputs for receiving a first input value and a second input value in a color space. The apparatus also comprises a color plane adjustment component operative to adjust the first input value and the second input value by amounts that depend on a distance of the first input value and second input value, respectively, from a value of neutral gray in the color space. The apparatus further comprises a set of outputs for outputting the adjusted first and second values. A related method and computer program are disclosed. Other embodiments are disclosed, and each of the embodiments can be used alone or together in combination.

These and other features and advantages will become apparent from the following description drawings and claims.

DETAILED DESCRIPTION OF EMBODIMENTS

By way of overview, the embodiments described herein relate to a method and apparatus for performing color plane adjustment. In the color plane adjustment technique disclosed in these embodiments, first and second input values in a color space are adjusted by amounts that depend on a distance of the first and second values, respectively, from a value of neutral gray in the color space. The result of this technique is that the adjustment to the first and second input values emphasizes colors that are closer to neutral gray and deemphasizes colors that are farther away from neutral gray. This reduces or eliminates the spurious color that is sometimes introduced when scanning a black-and-white document with a color scanner. Before turning to these embodiments, an overview of a prior scanner image processing system is described.

Figure 1:
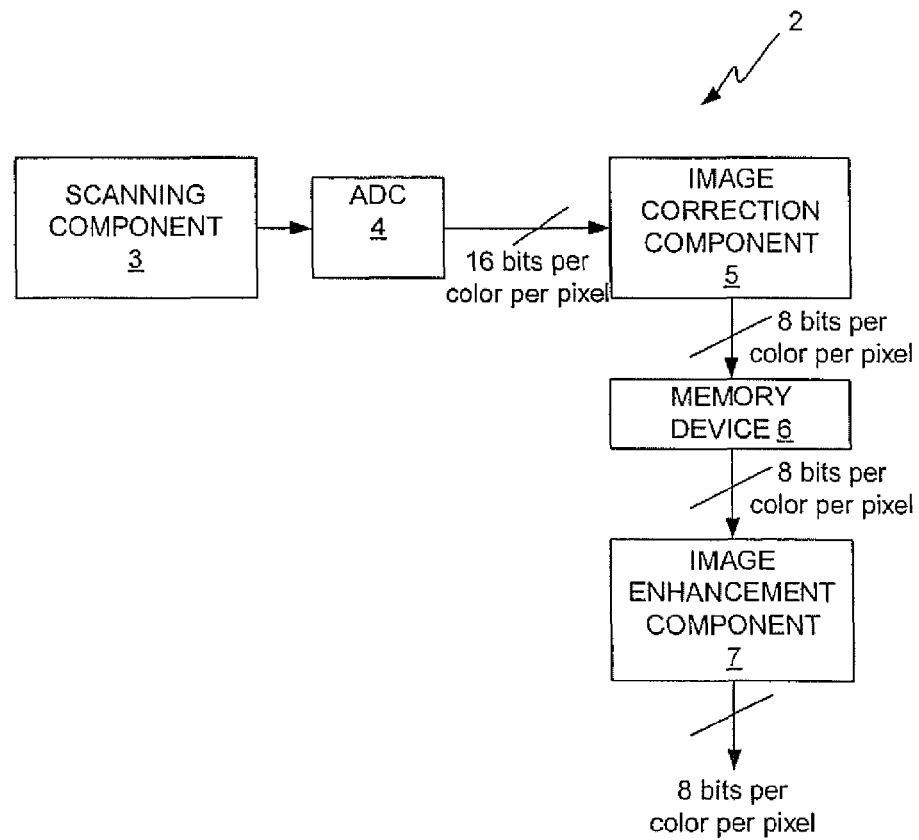
FIG. 1 illustrates a block diagram of a known scanner image processing system.

FIG. 1 illustrates a block diagram of a known scanner image processing system 2. The system 2 includes a scanning component 3 having a light source (not shown) that projects light onto the item being scanned (e.g., photograph) and a sensor component (not shown) comprising arrays of photodiodes or charge coupled devices (CCDs). The sensor component senses the light reflected off of the item being scanned and convert the sensed light into electrical signals. The electrical signals are converted into respective digital values called pixels by an analog-to-digital converter (ADC) 4. Typically, the ADC 4 outputs 16 bits per color per pixel, resulting in each pixel being represented by a 48-bit value.

An image correction component 5 receives the pixel values from the ADC 4 and processes them on a color-by-color basis (e.g., Red, then Blue, then Green) in accordance with an image correction algorithm. The image correction algorithm compensates for non-uniformities among the sensors of the scanning component 3. These non-uniformities are commonly referred to as photo-response non-uniformities (PR-NUs) and dark signal non-uniformities (DSNUs). The final stage of the image correction component 5 is a bit depth reduction stage (not shown) that reduces the data from 16 bits per color per pixel to 8 bits per color per pixel. This reduction may be as simple as dropping the lower 8 bits of each 16 bit per color pixel. The image correction component 5 outputs 24 bits per pixel, which corresponds to three 8-bit values that each represent the respective Red, Green and Blue (ROB) colors.

The data output from the image correction component 5 is then stored in a memory device 6 (e.g., dynamic random access memory (DRAM)). The purpose for the memory device 6 is to gather the R, G, B data so that it is all simultaneously available for processing in the subsequent stage in the image processing pipeline. This is needed because the spatial displacement of the sensors in the scanning component 3 results in the three color channels being processed at different points in time in the image correction component 5. The bit depth of the pixels is reduced prior to storing them in the memory device 6 to enable the size and associated cost of memory device 6 to be reduced.

The next component in the image processing pipeline is an image enhancement component 7, which enhances the image data. The image enhancement component 7 performs a color space conversion algorithm that converts the R, G, B values into a three-dimensional color space defined by Y, Cr and Cb values, where Y represents luminance and Cr and Cb values represent color. The Cr value is the color difference between Y and the color red. The Cb value is the color difference between Y and the color blue. After the R, G, B values have been converted into Y, Cr and Cb values, the image enhancement component 7 performs a color plane adjustment algorithm that adjusts the Cr and Cb values to produce corrected Cr and Cb values, which are then used by subsequent stages of the image processing pipeline.

The current color plane adjustment algorithm uses the Y value to index a Cr lookup table (LUT) and a Cb LUT to obtain a Cr adjustment value and a Cb adjustment value, respectively. The algorithm then adds the Cr and Cb adjustment values to the respective Cr and Cb values to obtain the respective corrected Cr and Cb values. This add operation amounts essentially to a shift of the Cr and Cb values.

One disadvantage of this color plane adjustment algorithm is that adding the Cr and Cb adjustment values to the current Cr and Cb values can result in certain colors being clipped. For example, assuming a Cr value is represented by 8 bits, the Cr value will be somewhere in the range of −128 to +127. If the Cr adjustment value is 5, for example, the corrected Cr value will be somewhere in the range of −123 to +127. Therefore, although the lower end of the range has changed, the upper end of the range has not changed. Consequently, if the corrected Cr value is greater than +127, the addition operation clips the Cr value at +127. If, for example, the Cr adjustment value is −5, then the corrected Cr value will be somewhere in the range of −128 to +122. Therefore, the lower end of the range has not changed, but the upper end of the range has changed. Consequently, if the corrected Cr value is less than −128, the corrected Cr value will be clipped to −128.

This shifting operation is particularly problematic in cases in which a color scanner is used to scan a black and white document. When a color scanner is used to scan a black and white document, some color is introduced into the scanner output. This is due to imperfections in the scanner elements. The color plane adjustment algorithm described above removes the color by performing the shift operation. The adjustment values are determined by measuring various shades of gray output from the scanner. However, when the adjustment values are applied to produce the corrected Cr and Cb values, they are applied to every color, rather than only the gray values. For values that are far from gray, applying the correction produces undesirable results.

The Y, Cr, Cb color space may be viewed as a cube with the vertical axis representing luminance, Y, and every horizontal slice of the cube representing the plane of all possible colors Cr and Cb at a particular luminance. At the center of each plane, the Cr and Cb values are zero, which means there is no color at all. This represents a neutral gray color. The centers of all of the planes form a line through the cube that is perpendicular to any horizontal color plane. This line represents a gray image varying from black to white that does not have any color. This line is the "neutral axis". The shift operation shifts each of these color planes relative to the neutral axis. For a given color plane, i.e., for a given Y value, all of the Cr and Cb values in the plane are shifted by the same amount. Because of clipping, some colors will never be reached and some different colors will be mapped to the same color. The shift algorithm works well for gray colors, but since it affects all of the other colors, it is not ideal.

Now that the prior scanner image processing system 2 in FIG. 1 has been described, embodiments will be presented that provide a method and an apparatus for performing color plane adjustment in a way that does not result in color clipping and that more accurately corrects gray colors. Embodiments will also be presented that provide a method and an apparatus for performing color plane adjustment in a way that is efficient in terms of hardware.

Figure 2:
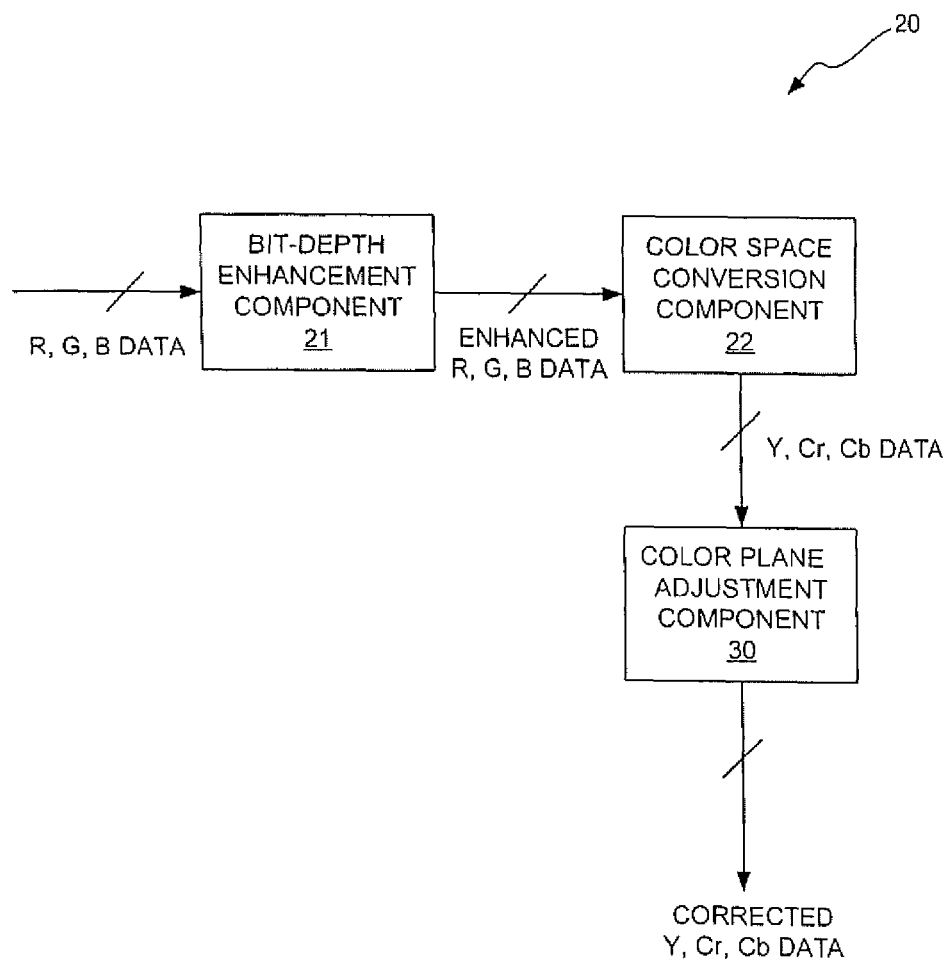
FIG. 2 illustrates a block diagram of the image enhancement apparatus and method of an embodiment.

FIG. 2 illustrates a block diagram of the image enhancement component 20 of an embodiment, which incorporates a color plane adjustment method and apparatus. A bit-depth enhancement component 21 of the image enhancement component 20 receives R, G, B data values and performs bit-depth enhancement on the R, G, B data values to produce enhanced R, G, B data values. The enhanced R, G, B data values are then processed by a color space conversion component 22, which converts the R, G, B data values into Y, Cr and Cb values. The Y, Cr and Cb values are then processed by the color plane adjustment (CPA) component 30 to produce corrected Y, Cr and Cb values, as described below in detail.

In accordance with this embodiment, the CPA component 30 adjusts the Cr and Cb color values to re-center them with respect to the neutral axis, i.e., the axis defined by the set of all gray values. This adjustment does not affect the edges of the Cr and Cb ranges, and therefore does not result in color clipping. Prior to adding the adjustment values to the Cr and Cb values, the adjustment values are scaled with a scaling factor that is closer to 1 when the Cr and Cb values are closer to the neutral axis (i.e., gray) and closer to 0 when the Cr and Cb values are farther away from the neutral axis. The scaled adjustment values are then added to the respective Cr and Cb values. Preferably, the scaling factor ranges from 0 to just less than 1. Thus, the Cr and Cb values are adjusted by amounts that depend on the Cr and Cb values, respectively. The result is that the adjustment to the Cr and Cb values emphasizes colors that are closer to the neutral axis (i.e., grays) and deemphasizes colors that are farther away from the neutral axis (i.e., non-grays).

The Cr and Cb values preferably are each adjusted as follows. A comparison operation is performed to determine whether the unadjusted Cr or Cb value is greater than or equal to one-half of the data range. For an N-bit number, it is determined whether the Cr or Cb value is greater than or equal to one half of N. If so, the value is logically inverted. If not, the value is left unchanged. For a 10-bit number, the data range is from −512 to +511. In order to avoid having to deal with signed numbers, the color plane preferably is shifted so that the data ranges from 0 to $2^N-1$. In the case of a 10-bit number, color plane is shifted so that the data range is from 0 to 1023. Therefore, the comparison operation in this case determines whether the value is greater than or equal to 512, and if so, logically inverts the value. The resulting value, n, of the comparison operation, whether inverted or not, is then multiplied by the adjustment value output from the LUT. The result of the multiplication operation is then divided by k, which is one half of N (e.g., 512 for a 10-bit number after shifting the color plane). The result of the division operation is then added to the corresponding unadjusted Cr or Cb value to obtain the corresponding adjusted Cr or Cb value.

The equation for computing the adjusted Cr value is given by:

$$Out\_Cr = LUT\_Cr[data\_Y] * n/k + data\_Cr, \quad \text{(Equation 1)}$$

where Out_Cr is the adjusted Cr value, LUT_Cr is the output from the LUT, data_Y is the Y value used to address the LUT, and data_Cr is the unadjusted Cr value. The value of n is the data_Cr value if data_Cr is less than one half of N. The value of n is the logically-inverted data_Cr value if the data_Cr value is greater than or equal to one half of N.

The equation for computing the adjusted Cb value is given by:

$$Out\_Cb = LUT\_Cb[data\_Y] * n/k + data\_Cb, \quad \text{(Equation 2)}$$

where Out_Cb is the adjusted Cb value, LUT_Cb is the output from the LUT, data_Y is the Y value used to address the LUT, and data_Cb is the unadjusted Cb value. The value of n is the data_Cb value if data_Cb is less than one half of N. The value of n is the logically-inverted data_Cb value if the data_Cb value is greater than or equal to one half of N. The manner in which these computations are carried out will now be described with reference to FIG. 3. The one half of N value (e.g., 512 in the 10-bit case) will be referred to herein as the "neutral point" in the color plane.

Figure 3:
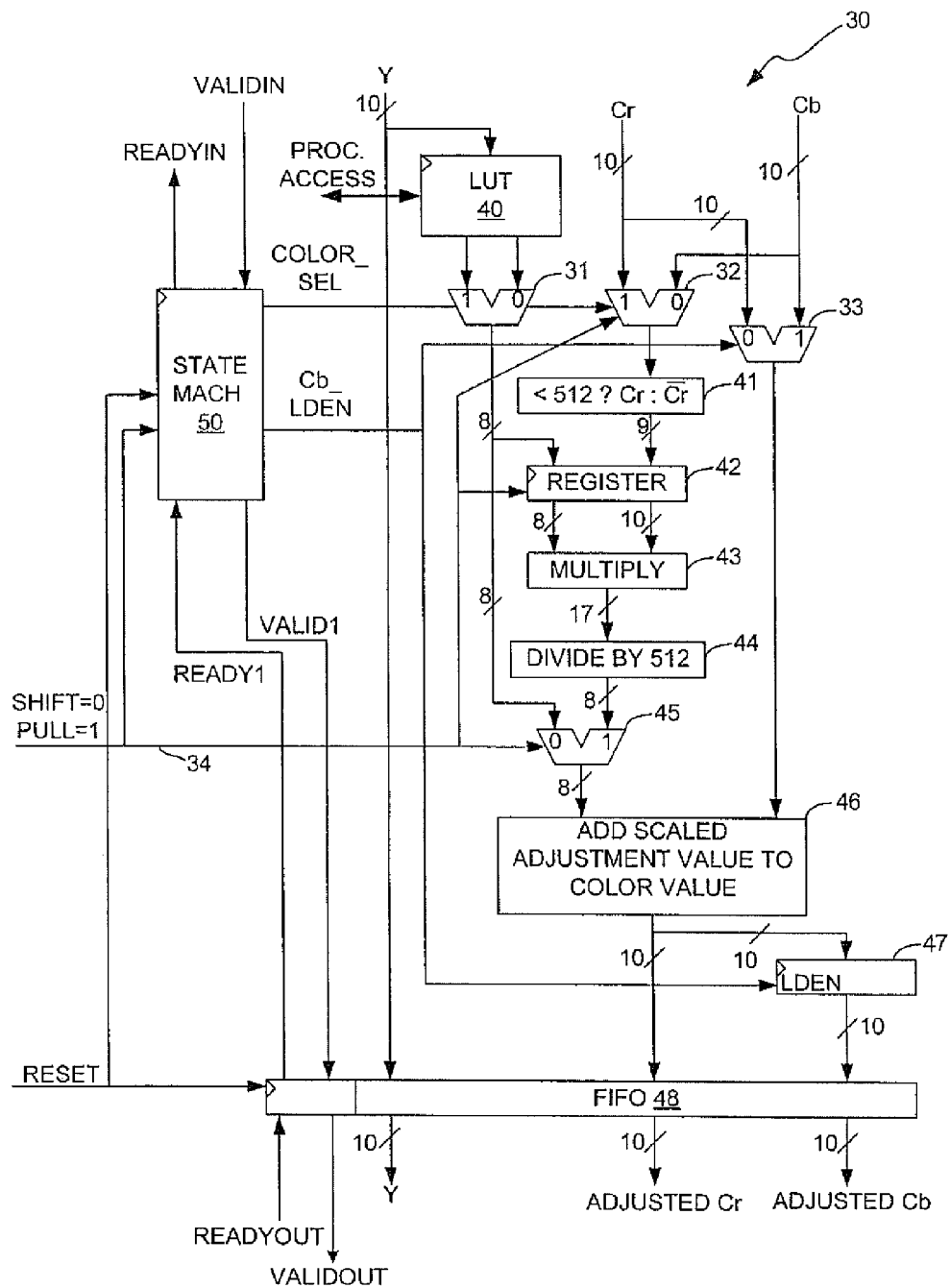
FIG. 3 illustrates a block diagram of the color plane adjustment apparatus in accordance with an embodiment implemented in the image enhancement apparatus shown in FIG. 2.

FIG. 3 illustrates a block diagram of the CPA component 30 of an embodiment. The CPA component 30 preferably uses a single LUT 40 to store the Cr and Cb adjustment values. This is in contrast to the known CPA component described above, which uses one LUT for storing the Cr adjustment values and another LUT for storing the Cb adjustment values. In accordance with this embodiment, each Y value is used to address a location in the LUT 40 that holds the Cr adjustment value and a location in the LUT that holds the Cb adjustment value. In accordance with this embodiment, it has been determined that because the same Y value is used to address both the Cr and Cb adjustment values, resources can be conserved by using a single LUT 40 to store both the Cr and Cb adjustment values. To accomplish this, the LUT 40 is made wide enough to store both the Cr and Cb values, and the Cr and Cb channels of the CPA 30 are accessed simultaneously using the incoming Y value. In the embodiment represented by the block diagram shown in FIG. 3, the Y, Cr and Cb values are each 10 bits in width. Of course, this embodiment is not limited to these values having any particular bit widths. The 10-bit Y value is to address the LUT 40. The LUT 40 holds 8-bit Cr and Cb adjustment values.

A state machine 50 controls the timing of events occurring in the CPA 30. The CPA 30 operates in two modes, namely, a Shift mode and a Pull mode. In the Shift mode, line 34 is taken low. In the Shift mode, the CPA 30 produces results similar to those produced by the known CPA described above because the adjustment value output from the LUT 40 is simply added to the unadjusted Cr or Cb value to obtain the adjusted Cr or Cb value. In the Pull mode, line 34 is taken high, and the operations of the embodiment described above with reference to Equations 1 and 2 are performed to obtain the adjusted Cr and Cb values. The operations performed by the CPA 30 when it is in the Pull mode (line 34 taken high) will first be described, and then the operations performed by the CPA 30 when it is in the Shift mode (line 34 taken low) will be described.

Line 34 is set high. This enables multiplexer (MUX) 32, register 42 and chooses the "1" input of MUX 45. When the ReadyIn signal output by the state machine 50 to the previous pipeline stage (not shown) is asserted indicating that the CPA 30 is ready to process the next Cr and Cb pair, and when the ValidIn signal is asserted indicating that the Y, Cr and Cb values received in the CPA 30 from the previous stage are valid, the Color_Sel signal is set low. This causes the MUX 31 to select the Cb adjustment value output from the LUT 40 and load the selected value into register 42. The Color_Sel signal is also received by MUX 32. This causes the unadjusted Cb value to be selected, passed through the comparison logic 41, and then loaded into register 42.

The comparison logic 41 performs the aforementioned operation of comparing the unadjusted Cb value to 512. The logic 41 first determines whether the most significant bit (MSB) of the unadjusted Cb value is a 0 or a 1. If the bit is a 0, this indicates that the value is less than 512. If the bit is a 1, this indicates that the value is greater than or equal to 512. Therefore, if the MSB is a 1, the 9 lower bits of the unadjusted Cb value are logically inverted and loaded into register 42. If the MSB is a 0, the 9 lower bits of the unadjusted Cb value are loaded into register 42 unchanged. Register 42 now holds the 8-bit Cb adjustment value and a 10-bit value corresponding to the 9-bit value output from the comparison logic 41 having a 0 MSB concatenated to it to convert it from an unsigned number to a positive signed number. These bits are then multiplied by each other in multiplication logic 43 to produce an 18-bit result, of which the MSB is discarded. Division logic 44 then divides these 17 bits by 512 by truncating the lower 9 bits of the result to produce an 8-bit result. The multiply and divide operations performed by multiply logic 43 and divide logic 44, respectively, correspond to multiplying by n and dividing by k, respectively, as described above with reference to Equation 2. The 8-bit result is then passed through addition logic 46 via the selection of the "1" input to MUX 45 (line 34 is high).

The MUX 33 receives a Cb_LDEN signal. When the CPA 30 is computing the adjustment value for Cb, the Cb_LDEN is high, which causes the unadjusted Cb value to be passed through addition logic 46. In the addition logic 46, the unadjusted Cb value has a 0 MSB concatenated onto it to convert it from an unsigned number to a positive signed number, as will be described below in more detail. The inputs to the addition logic 46 are now the 8-bit result from MUX 45 and the 11-bit unadjusted Cb (includes concatenated 0 MSB). The addition logic 46 adds these bit values together and truncates the result to produce a 10-bit adjusted Cb value. The devices 41-44 comprise a CPA pipeline that performs the above described tasks when the CPA 30 is operating in the Pull mode.

The adjusted Cb value output from the addition logic 46 is loaded into a register 47. The register 47 holds the Cb value until the CPA 30 has had time to perform similar operations to obtain the adjusted Cr value at the output of addition logic 46. As described below, when the adjusted Cr value has been produced by the addition logic 46, the Valid1 signal is asserted. This causes the Y value and the adjusted Cb and Cr values to be loaded into an output first-in-first-out (FIFO) memory device 48 when the Ready1 signal is asserted.

The adjusted Cr value is produced in the following manner in the Pull mode. The Color_Sel signal is set high, which causes the MUX 31 to select the Cr adjustment value output from the LUT 40 and load the selected value into register 42. The Color_Sel signal received by MUX 32 causes the unadjusted Cr value to be selected, passed through the comparison logic 41, and then loaded into register 42. The comparison logic 41 performs the aforementioned operation of comparing the unadjusted Cr value to 512. The logic 41 first determines whether the most significant bit (MSB) of the unadjusted Cr value is a 0 or a 1. If the MSB is a 1, the 9 lower bits of the unadjusted Cr value are logically inverted and loaded into register 42. If the MSB is a 0, the 9 lower bits of the unadjusted Cr value are loaded into register 42 unchanged. Register 42 now holds the 8-bit Cr adjustment value and a 10-bit value corresponding to the 9-bit value output from the comparison logic 41 having a 0 MSB concatenated to it to convert it from an unsigned number to a positive signed number. These bits are then multiplied by each other in multiplication logic 43 to produce an 18-bit result, of which the MSB is discarded. Division logic 44 then divides these 17 bits by 512 by truncating the lower 9 bits of the result to produce an 8-bit result. The multiply and divide operations performed by logic multiply 43 and divide logic 44, respectively, correspond to multiplying by n and dividing by k, respectively, to produce the scaling factor, as described above with reference to Equation 1. Therefore, the multiply and divide logic 43 and 44 together may be thought of as scaling logic for scaling the adjustment values output from the LUT. The 8-bit result of the divide operation is then passed through addition logic 46 via the selection of the "1" input to MUX 45 when in the Pull mode (line 34 is high).

When the adjustment for Cr is being computed, the Cb_LDEN signal received by MUX 33 is set low, which causes the unadjusted Cr value to be selected by MUX 33 and passed through addition logic 46. In the addition logic 46, a 0 MSB is concatenated to the unadjusted Cr value to convert it from an unsigned number to a positive signed number. The inputs to the addition logic 46 are now the 8-bit result from MUX 45 and the 11-bit unadjusted Cr value (includes concatenated 0 MSB). The addition logic 46 adds these bit values together and truncates the result to produce a 10-bit adjusted Cr value. When the adjusted Cr value has been produced, the Valid1 signal is asserted. This causes the Y value and the adjusted Cr and Cb values to be loaded into the FIFO 48 when the Ready1 signal is asserted. When the ValidOut and ReadyOut signals are asserted, the Y value and the adjusted Cr and Cb values to be output from the FIFO 48 are sent to the next stage of the image processing pipeline (not shown).

In the Shift mode of operations, line 34 is taken low, which causes the "0" input of MUX 45 to be selected. This also disables MUX 32 and register 42. Disabling these devices enables the CPA 30 to conserve power when the computations described above with reference to the comparison logic 41, the multiply logic 43 and the divide logic 44 do not need to be performed. When the ValidIn and ReadyIn signals are asserted, the Y value received by the LUT 40 causes a Cb adjustment value stored at the location indexed by the Y value to be output from the LUT 40. The Color_Sel signal is set low, which causes the MUX 31 to select its "0" input. This causes the Cb adjustment value to be selected by MUX 31 and sent to MUX 45. Because line 34 is low, the "0" input of MUX 45 is selected, which causes the Cb adjustment value to be passed through the addition logic 46. Cb_LDEN is set high, which causes the unadjusted Cb value to be selected by MUX 33 and passed through addition logic 46. As stated above, a 0 MSB is concatenated onto the unadjusted Cb value to convert it to a positive signed number. The Cb adjustment value from the LUT 40 and the unadjusted Cb value are then added together by the addition logic to produce the adjusted Cb value, which is then loaded into register 47.

The Color_Sel signal is then asserted high, which causes the Cr adjustment value stored in the LUT 40 to be selected by MUX 31 and sent to MUX 45. Because line 34 is low, the "0" input of MUX 45 is selected, which causes the Cr adjustment value to be passed through addition logic 46. Cb_LDEN is set low, which causes the unadjusted Cr value to be selected by MUX 33 and passed through addition logic 46. Addition logic 46 then adds the Cr adjustment value to the unadjusted Cr value to produce the adjusted Cr value. When the adjusted Cr value has been produced, the Valid1 signal is asserted. This causes the Y value and the adjusted Cr and Cb values to be loaded into the FIFO 48 when the Ready1 signal is asserted. When the ReadyOut and ValidOut signals are asserted, the Y value and the adjusted Cr and Cb values are output from the FIFO 48 and sent to the next stage in the pipeline.

The LUT 40 may be made accessible to a processor for testing and/or configuring the LUT 40, as indicated by the input/output arrow labeled "PROC. ACCESS". The "RESET" signal resets the FIFO 48 and the state machine 50, as will be described below in more detail with reference to FIG. 4.

Figure 4:
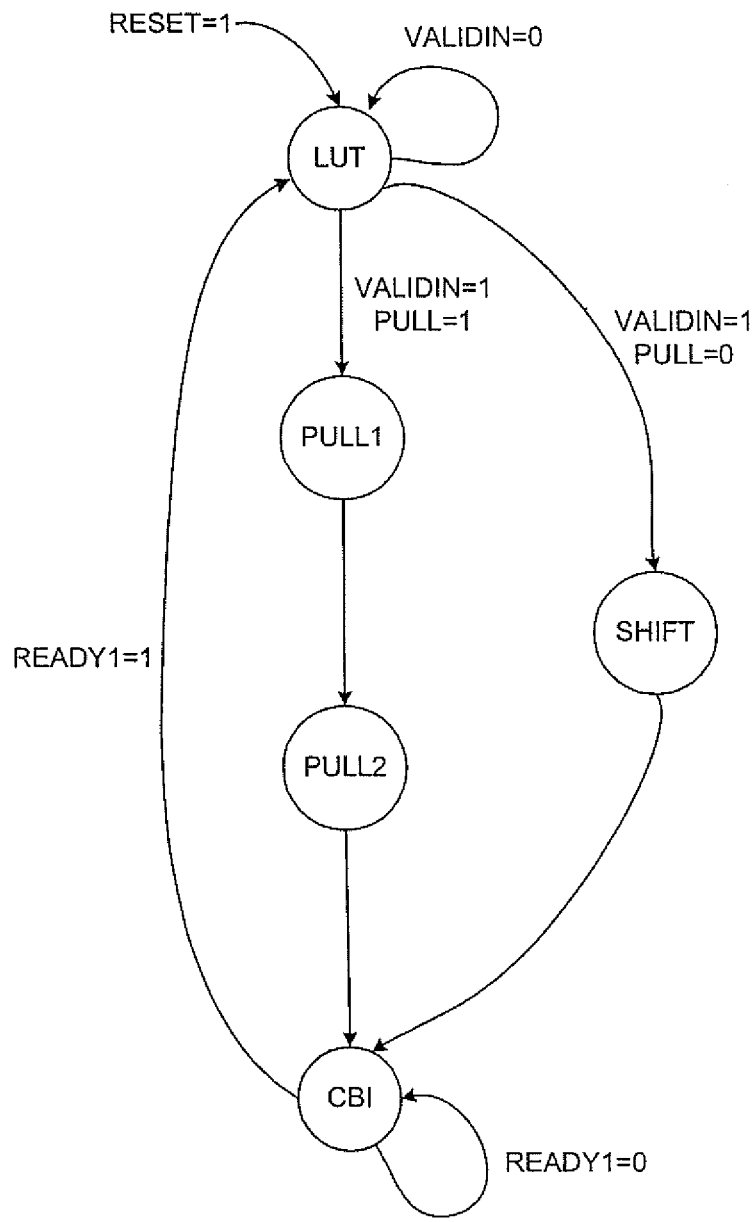
FIG. 4 illustrates a state diagram that demonstrates the states of the state machine shown in FIG. 3.

FIG. 4 illustrates a state diagram that represents the states of the state machine 50 shown in FIG. 3. The state machine 50 has a LUT state, a Shift state, a Pull1 state, a Pull2 state, and a common block interface (CBI) state. In the embodiment of the CPA 30 described above, the additional computations performed by the CPA pipeline in the Pull mode require an additional clock state. This can be seen in FIG. 4 by the fact that there are two Pull states, Pull1 and Pull2, compared to a single Shift state.

Whenever the RESET signal is asserted, the state machine 50 enters the LUT state. The state machine 50 starts out in the LUT state and awaits input from the prior pipeline stage. The ReadyIn signal output from the state machine 50 is not asserted in this state. The reason for this is that when the prior pipeline stage has valid data (Y, Cr, Cb) for the CPA 30, this data needs to be held by the prior stage while the CPA 30 performs its calculations. Thus, the data handshake signal ReadyIn is not asserted until the resulting output of the CPA 30 is going to be received into the output FIFO 48, which happens in the CBI state when the Ready1 signal is asserted. The LUT state awaits the ValidIn input assertion to indicate that valid data is coming into the CPA 30.

Upon ValidIn being asserted, the state machine 50 goes into the Shift state if the Shift mode is selected, i.e., the Shift signal on line 34 is low. The same clock edge that causes this state transition also causes the Cr and Cb adjustment values to be output from the LUT 40. As indicated above, Cb is first processed, followed by Cr. In the Shift state, the Color_Sel signal multiplexes the Cb correction value output from the LUT 40, and the Cb_LDEN signal multiplexes the unadjusted Cb value to the addition logic 46. The addition logic 46 is combinatorial, so its output also becomes valid during the Shift state. The FIFO 48 may not be loaded yet since both the adjusted Cr and Cb values are loaded in parallel, and only the adjusted Cb value is valid in this State. Therefore, the adjusted Cb value is saved in a holding register 47. Thus, the Cb_LDEN signal is asserted in the Shift state to cause the adjusted Cb value to be loaded into the holding register 47.

The CBI state is entered unconditionally from state Shift or Pull2 states. The CBI state sets the value of the Color_Set signal to allow the Cr adjustment value output from the LUT 40. The Cb_LDEN signal multiplexes the unadjusted Cr value to propagate through the addition logic 46. At the end of the CBI state, the adjusted Cr value is present on the input of the output FIFO 48. The adjusted Cb value is also present on the input of the output FIFO 48 as it is being sourced from the holding register 47. Thus, in this state it is necessary to notify the output FIFO 48 that valid data is ready to be received. This is accomplished by asserting the Valid1 signal. Hence, the state machine equation for Valid1 is simply (state=CBI). The FIFO 48 may not be ready to receive the adjusted Cr and Cb values. Its readiness is indicated by the assertion of the Ready1 signal. Hence, the exit from the CBI state depends on Ready1 being asserted.

In the Pull mode, the adjustment values from the LUT 40 cannot propagate through the CPA pipeline and addition logic 46 within a single state. The register 42 is needed for this reason. The state machine 50 inserts an additional state to allow for data to propagate through the extra pipeline stage comprising devices 41-45. In the Pull1 state, the Color_Sel signal output from the state machine 50 selects the Cb adjustment value output from the LUT 40 as well as the unadjusted Cb value from the prior stage. The two tasks accomplished in the PULL1 state are to access the LUT 40 and to perform the selectable inversion on the incoming unadjusted Cb value in comparison logic 41. These values are stored in the register 42 in the Pull1 state.

The state machine 50 unconditionally transitions from Pull1 state to the Pull2 state. Within the Pull2 state, the adjustment value and the inverted or non-inverted Cb value stored in register 42 are propagated through the multiply and divide logic 43 and 44, and are finally added to the unadjusted Cb value using the addition logic 46. As before, the adjusted Cb value is set aside in the register 47. In this same state, the Color_Sel signal is set to 1 to select the Cr data, and the Cr adjustment value output from the LUT 40 and the unadjusted Cr value are processed through the upper half of the CPA pipeline. Hence, the Cr adjustment value output from the LUT 40 and the selectively inverted unadjusted Cr value are stored in the register 42 of the CPA 30 as the state machine 50 transitions from the Pull2 state to the CBI state. The CBI state was discussed in an earlier paragraph.

Figure 5:
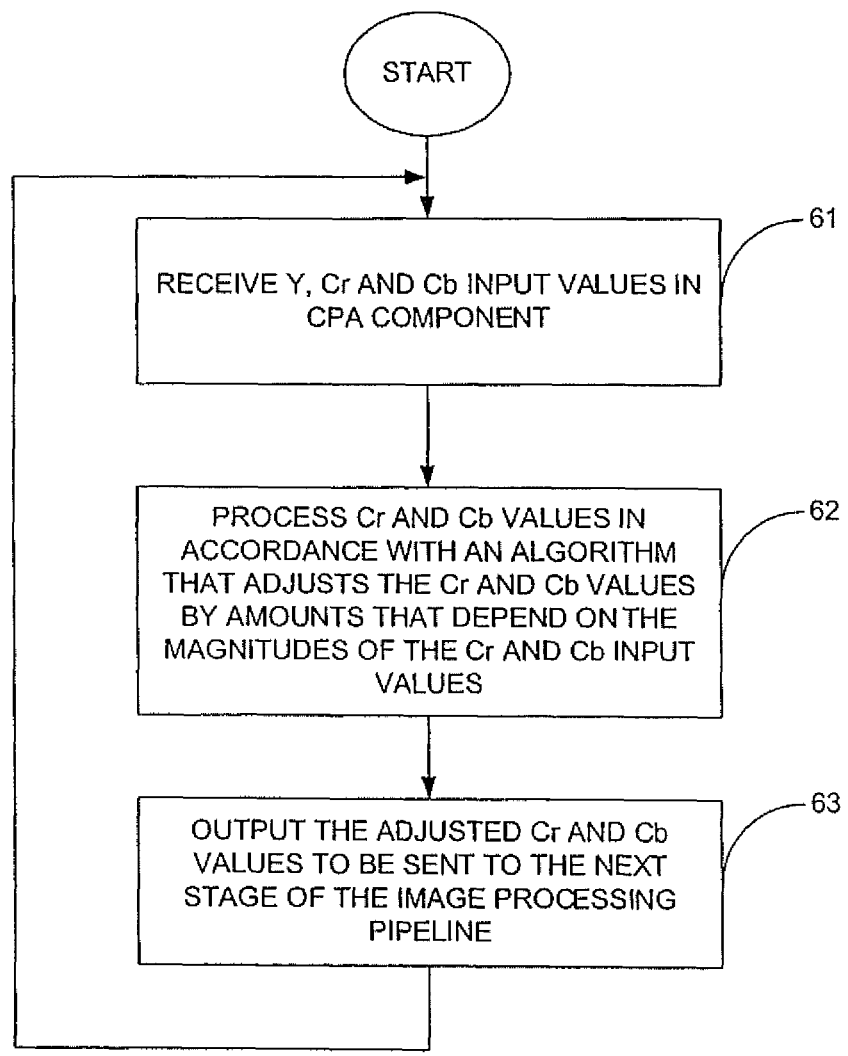
FIG. 5 illustrates a flowchart that represents the method of an embodiment.

FIG. 5 illustrates a flowchart that represents the method of an embodiment. The method may be performed in hardware, software, or a combination of hardware, software and/or firmware. If the embodiment is performed in software, the software is typically stored on some type of computer-readable medium such as, for example, random access memory (RAM), dynamic RAM (DRAM), flash memory, read only memory (ROM) compact disk ROM (CD-ROM), digital video disks (DVDs), magnetic disks, magnetic tapes, etc.

With reference to FIG. 5, the CPA 30 receives the Y, Cr and Cb input values, as indicated by block 61. The CPA 30 processes the Cr and Cb input values in accordance with an algorithm that adjusts each of the Cr and Cb input values by an amount that depends on the respective Cr and Cb input values, as indicated by block 62. The adjusted Cr and Cb values and the unaltered Y value are then output from the CPA 30 to be sent to the next stage of the image processing pipeline, as indicated by block 63. The process may then return to block 61 for processing of the next Cr and Cb pair.

While a three-dimensional color space defined by Y, Cr, and Cb values has been used to illustrate these embodiments, it should be noted that other color spaces can be used. For example, the Lab color space can be used. In the Lab color space, the L value represents the luminance of the color (with the smallest L value yielding black), the a value represents a position between red and green (with the smallest a value yielding green), and the b value represents a position between yellow and blue (with the smallest b value yielding blue).

It should be noted that the invention has been described with reference to preferred and exemplary embodiments and that the invention is not limited to these embodiments. For example, the invention is not limited to the CPA configuration shown in FIG. 3, as will be understood by those skilled in the art. In addition, while the CPA shown in FIG. 3 has been described above as being implemented in hardware, it may be implemented in hardware, software, or a combination of hardware, software and/or firmware. Accordingly, the term "logic" as used herein can refer to hardware, software, or a combination of hardware, software and/or firmware. For example, "logic" can be a pure hardware implementation or can be a processor running a computer program. Also, separate LUTs may be used for the Cr and Cb channels if desired, and additional circuitry can be used to allow the Cr and Cb channels to be processed in parallel rather than being time division multiplexed. Also, the adjusted Cr and Cb values can be produced using operations other than those described be Equations 1 and 2. Equations 1 and 2 represent examples of operations that can be used to make the desired adjustments to the Cr and Cb values. Further, the term "set" refers to a group of one or more than one member. Those skilled in the art will understand, in view of the description provided herein, the manner in which the embodiments described herein can be altered and that all such alterations are within the scope of the invention.

What is claimed is:

1. An apparatus for performing color plane adjustment, the apparatus comprising:
   an input configured to receive an input value in a color space, the input value comprised of at least a first color component input value and a second color component input value;
   a controller including a color plane adjustment component configured to:
      determine a difference between the first color component input value and a gray value along a gray axis of values in the color space, wherein the gray axis is a line within the color space that is defined as separate from and in relation to axes that comprise the color space;
      determine a difference between the second color component input value and the gray value;
      access a first color component adjustment factor based on the difference between the first color component input value and the gray value;
      adjust the first color component input value by the first color component adjustment factor, wherein the first color component adjustment factor increases the first color component input value as the difference between the first color component input value and the gray value is smaller, and decreases the first color component input value as the difference between the first color component input value and the gray value is greater;
      access a second color component adjustment factor based on the difference between the second color component input value and the gray value;
      adjust the second color component input value by the second color component adjustment factor, wherein the second color component adjustment factor increases the second color component input value as the difference between the second color component input value and the gray value is smaller, and decreases the second color component input value as the difference between the second color component input value and the gray value is greater, and
   an output configured to output the adjusted first color component input value and the adjusted second color component input value.

2. The apparatus of claim 1, wherein the first color component input value is a Cr input value and the second color component input value is a Cb input value of a Y, Cr, Cb color space.

3. The apparatus of claim 2, wherein the input a Y input value, and wherein the first color component adjustment value is a Cr adjustment value and the first color component adjustment value is a Cb adjustment value, and wherein the color plane adjustment component further comprises:
  a lookup table (LUT) that stores the Cr and the Cb adjustment values at locations in the LUT designated by LUT addresses, and wherein the LUT receives the Y input value at an input of the LUT and uses the Y input value to generate an address designating a location in the LUT at which the corresponding Cr adjustment value is stored and an address designating a location in the LUT at which the corresponding Cb adjustment value is stored, the LUT outputting the Cr adjustment value and the Cb adjustment value stored at the locations designated by the addresses from an output of the LUT;
  a color plane adjustment (CPA) pipeline that adjusts the Cr input value and the Cb input value, the CPA pipeline receiving at an input of the CPA pipeline the Cr adjustment value and the Cb adjustment value output from the LUT and the Cr and Cb input values input to color plane adjustment component, the CPA pipeline processing the Cr input value and Cb input value to produce a Cr scaling factor and a Cb scaling factor, the CPA pipeline applying the Cr scaling factor to the Cr adjustment value to produce a scaled Cr adjustment value, the CPA pipeline applying the Cb scaling factor to the Cb adjustment value to produce a scaled Cb adjustment value; and
  addition logic operative to add the scaled Cr adjustment value to the Cr input value to produce an adjusted Cr value, the addition logic adding the scaled Cb adjustment value to the Cb input value to produce an adjusted Cb value.

4. The apparatus of claim 3, wherein the color plane adjustment component further comprises:
  time division multiplexing (TDM) logic, configured to interface the LUT output with the CPA pipeline; and
  a state machine operative to control the TDM logic to cause the TDM logic to time division multiplex the Cr adjustment value and the Cb adjustment value and to time division multiplex the Cr and Cb input values to the input of the CPA pipeline.

5. The apparatus of claim 3, wherein the CPA pipeline comprises:
  comparison logic operative to process the Cr input value and the Cb input value to determine respective differences between the gray value and the Cr input value and the Cb input value, the comparison logic outputting a comparison result.

6. The apparatus of claim 5, wherein the CPA pipeline comprises:
  scaling logic that receives the comparison result, the scaling logic operative to multiply the comparison result by an adjustment value output from the LUT to produce a multiply result and divide the multiply result by a normalizing value to produce one of the scaled Cr adjustment value or the Cb adjustment value, the scaled Cr adjustment value or the Cb adjustment value being output from the scaling logic and sent to the addition logic.

7. The apparatus of claim 1, wherein the apparatus is incorporated into a scanner, a printer or a copier.

8. The apparatus of claim 1, wherein the input receives input values and the color plane adjustment component further comprises:
  a look up table configured to store the adjustment value for the first input value and the adjustment value for the second input value; and
  a color plane adjustment pipeline configured to obtain the adjustment value for the first input value and the adjustment value for the second input value stored in the lookup table, and further to adjust the input value by scaling the input value by a scaling factor that correspond to the obtained adjustment value for the first input value and the adjustment value for the second input.

9. The apparatus of claim 1, wherein the gray axis is located at a center of color planes that comprise the color space.

10. The apparatus of claim 1, wherein the gray axis corresponds to values in the color space that represent a lack of color.

11. A method for performing color plane adjustment with a controller, the method comprising:
  receiving, at the controller, at least one input value from a color space, the input value comprised of at least a first color component input value and a second color component input value;
  determining a difference between the first color component input value and a gray value along a gray axis of values in the color space, wherein the gray axis is a line within the color space that is defined as separate from and in relation to axes that comprise the color space;
  determining a difference between the second color component input value and the gray value;
  accessing a first color component adjustment factor based on the difference between the first color component input value and the gray value;
  adjusting the first color component input value by the first color component adjustment factor, wherein the first color component adjustment factor increases the first color component input value as the difference between the first color component input value and the gray value is smaller, and decreases the first color component input value as the difference between the first color component input value and the gray value is greater;
  accessing a second color component adjustment factor based on the difference between the second color component input value and the gray value;
  adjusting the second color component input value by the second color component adjustment factor, wherein the second color component adjustment factor increases the second color component input value as the difference between the second color component input value and the gray value is smaller, and decreases the second color component input value as the difference between the second color component input value and the gray value is greater, and
  outputting the adjusted first color component input value and the adjusted second color component input value.

12. The method of claim 11, wherein the first color component input value comprises a Cr input value and the second color component input value comprises a Cb input value in a Y, Cr, Cb color space and the Cr input value and the Cb input value are adjusted by amounts that depend on respective distances of the Cr input value and the Cb input value from a neutral value in the Y, Cr, Cb color space.

13. The method of claim 12, wherein the at least one input value comprises a Y input value, and the first color component adjustment value is a Cr adjustment value and the second color component adjustment value is a Cb adjustment value, the method comprising:
  accessing a lookup table (LUT) with the Y input value to lookup the Cr and Cb adjustment values stored at locations that are designated by LUT addresses; and
  receiving, at an input of a color plane adjustment (CPA) pipeline, the Cr adjustment value and the Cb adjustment value from the LUT and the Cr input value and the Cb input value.

14. The method of claim 13, further comprising:
- in the CPA pipeline, processing the Cr input value and the Cb input value to produce a Cr scaling factor and a Cb scaling factor;
- in the CPA pipeline, applying the Cr scaling factor to the Cr adjustment value to produce a scaled Cr adjustment value; and
- in the CPA pipeline, applying the Cb scaling factor to the Cb adjustment value to produce a scaled Cb adjustment value.

15. The method of claim 14, wherein the adjusted input value comprises an adjusted Cr value and an adjusted Cb value, the method further comprising:
- adding the scaled Cr adjustment value to the Cr input value to produce the adjusted Cr value;
- adding the scaled Cb adjustment value to the Cb input value to produce the adjusted Cb value; and
- outputting the adjusted Cr value and the adjusted Cb value from the controller.

16. The method of claim 15, wherein processing the Cr input value and the Cb input value in the CPA pipeline includes:
- comparing the Cb input value with the gray value to determine a difference between the gray value and the Cb input value to produce a Cb comparison result; and
- comparing the Cr input value with the gray value to determine a difference between the gray value and the Cr input value to produce a Cr comparison result.

17. The method of claim 11, wherein the method is used in a scanner machine, a copier machine, or a printer machine.

18. The method of claim 11, wherein the first color component adjustment factor and the second color component adjustment factor are stored in a lookup table (LUT) such that the first color component adjustment factor and the second color component adjustment factor are accessed from the LUT, and
the method further comprising:
- receiving, at an input of a color plane adjustment (CPA) pipeline, the accessed first color component adjustment factor and the second color component adjustment factor from the LUT;
- in the CPA pipeline, processing the first color component adjustment factor and the second color component adjustment factor to produce a first scaling factor and a second scaling factor; and
- in the CPA pipeline, further adjusting the value adjusted first color component input value by scaling the adjusted first color component input value by the first scaling factor, and further adjusting the adjusted second color component input value by scaling the adjusted second color component input value by the second scaling factor.

19. A color plane converter comprising:
- an input device configured to receive a first input value, a second input value, and a third input value in a color space;
- a controller configured to:
  - determine a difference between the first input value and a gray value along a gray axis of values in the color space, wherein the gray axis is a line within the color space that is defined as separate from and in relation to axes that comprise the color space;
  - determine a difference between the second input value and the gray value;
  - determine an adjustment value for the first input value based on the difference between the first input value and the gray value, wherein the adjustment value increases the first input value as the first input value is closer to the gray value along a gray axis of values in the color space and the adjustment value decreases the first input value as the first input value is further away from the gray value along the gray axis in the color space;
  - determine an adjustment value for the second input value based on the difference between the second input value and the gray value, wherein the adjustment value increases the second input value as the second input value is closer to the gray value along the gray axis of values in the color space and the adjustment value decreases the second input value as the second input value is further away from the gray value along the gray axis in the color space;
  - process the first input value to produce a first-input-value scaling factor;
  - process the second input value to produce a second-input-value scaling factor;
  - apply the first-input-value scaling factor to the adjustment value for the first input value to produce a scaled adjustment value for the first input value;
  - apply the second-input-value scaling factor to the adjustment value for the second input value to produce a scaled adjustment value for the second input value;
  - add the scaled adjustment value for the first input value to the first input value to produce an adjusted first input value; and
  - add the scaled adjustment value for the second input value to the second input value to produce an adjusted second input value; and
- an output device configured to output the adjusted first input value and the adjusted second input value.

20. The color plane converter of claim 19, wherein the controller is configured to time division multiplex the first and second adjustment values and the first and second input values.

* * * * *